United States Patent [19]
Coil

[11] 3,740,074

[45] June 19, 1973

[54] MOTORCYCLE TOWING DEVICE

[76] Inventor: Frederick J. Coil, 109 Latham Trailer Courts, Latham, N.Y. 12110

[22] Filed: July 12, 1971

[21] Appl. No.: 161,747

[52] U.S. Cl. ............................... 280/402, 280/292
[51] Int. Cl. ........................................... B62d 53/04
[58] Field of Search ........................... 280/292, 402

[56] References Cited
UNITED STATES PATENTS
3,428,332  2/1969  McCance........................... 280/292
FOREIGN PATENTS OR APPLICATIONS
904,744  2/1954  Germany ........................... 280/292
950,769  10/1956  Germany ........................... 280/402

*Primary Examiner*—Leo Friaglia
*Attorney*—Walter F. Wessendorf, Jr.

[57] ABSTRACT

Discloses a device for use with a towing vehicle to tow a two-wheeled vehicle having a pivotal front wheel and a rear wheel. The device includes a hitch-bar assembly, detachably attached to the rear of the towing vehicle, carrying a frame assembly which carries a mounting bracket assembly. The pivotal front wheel is raised off the ground and rests on elongated channels of the mounting bracket assembly which has middle spacer plates providing lateral support for the front wheel. Spring-tension adjustable main springs mounted laterally of the front wheel on the mounting bracket assembly and on the spring forks of the motorcycle maintain the motorcycle upright in straight ahead movement of the towing vehicle and allow the motorcycle to track the towing vehicle taking a curve or deviating from straight ahead movement by tilting or canting movement of the motorcycle corresponding to the tilting or canting movement of the towing vehicle taking a curve or deviating from straight ahead movement. Spring-tension adjustable auxiliary springs similarly mounted function as a safety factor for the main springs in case of their malfunction or breakage. The frame assembly is carried on the hitch-bar assembly to be rotatable for up and down return movement of the frame assembly and thereby the mounting bracket assembly when the rear wheel of the motorcycle hits a bump.

9 Claims, 11 Drawing Figures

PATENTED JUN 19 1973
3,740,074
SHEET 1 OF 3
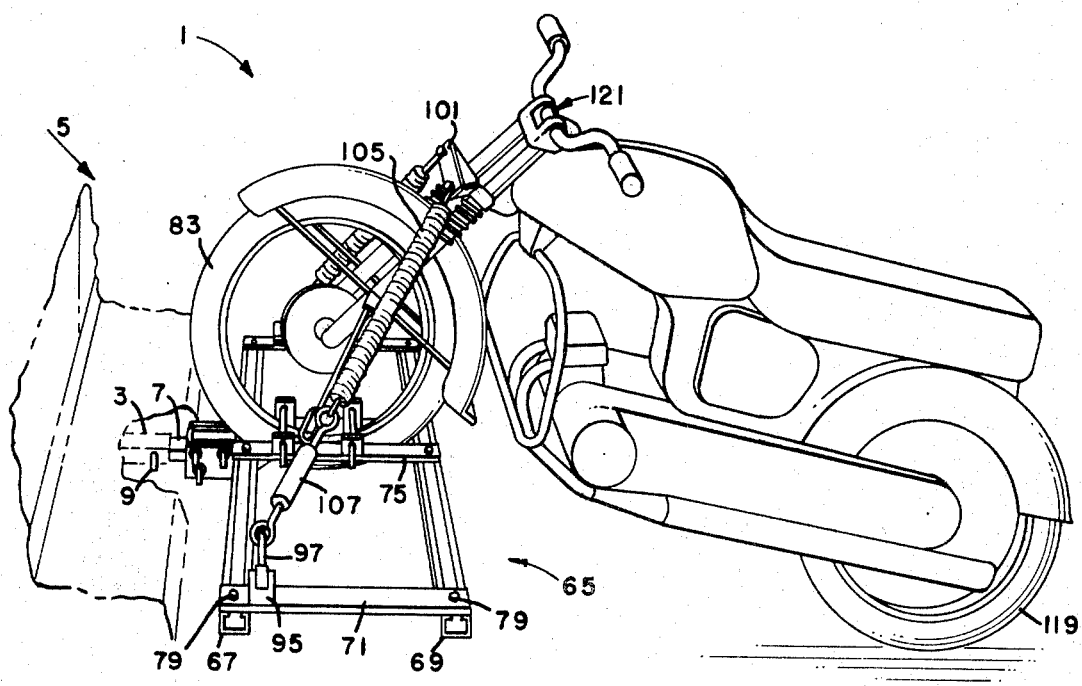
FIG. 1.
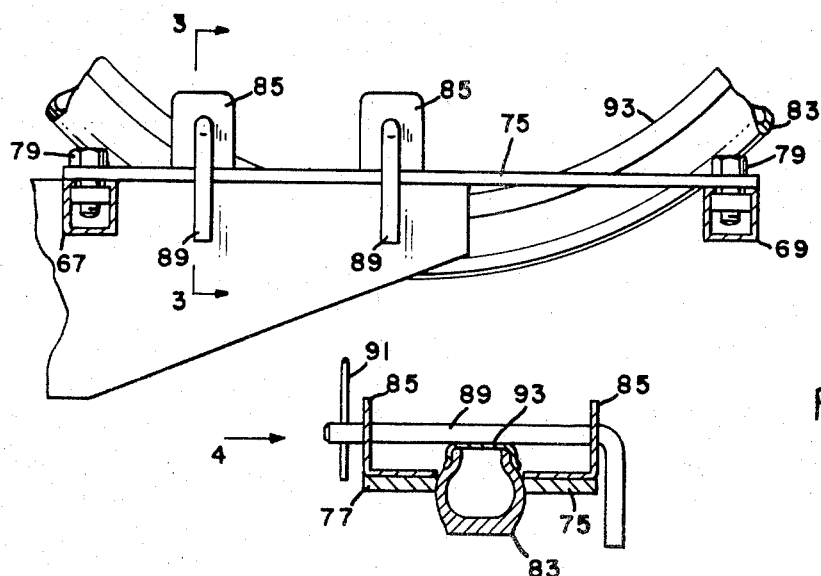
FIG. 2.
FIG. 3.
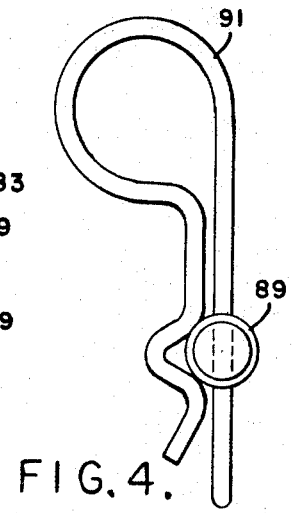
FIG. 4.
INVENTOR
FREDERICK J. COIL
BY
Walter J. Wassendorf Jr.
Attorney 3,740,074

INVENTOR
FREDERICK J. COIL

BY
Walter J. Wensersky Jr.
attorney

INVENTOR
FREDERICK J. COIL

MOTORCYCLE TOWING DEVICE

This invention relates to a motorcycle towing device for use with a towing vehicle to tow a two-wheeled motorcycle having a pivotal front wheel and a rear wheel.

The problems in the art to which this invention apertains are the need for motorcycle moJorcycle towing device that can be easily and quickly attached and detached from the towing vehicle; that, attached to the towing vehicle, can be simply and easily disposed in a compact unloaded position for subsequent towing use; that, attached to the towing vehicle, can be simply and easily disposed in a loading position whereby the motorcycle can be wheeled onto the device such that its front wheel rests on the device, and can subsequently be raised or jacked-up for disposition in its towing position; that, in its towing position, maintains the motorcycle in an upright position in straight ahead movement of the towing vehicle, and allows the motorcycle to track the towing vehicle taking a curve or deviating from straight ahead movement by tilting or canting movement of the motorcycle corresponding to the tilting or canting movement of the towing vehicle taking a curve or deviating from straight ahead movement; that provides for up and down return movement when the rear wheel of the towed motorcylce hits a bump; that permits impact shock forces, transmitted when the rear wheel of the motorcycle hits a bump, to be relieved and attenuated to prevent stress and strain and consequent damage to the motorcycle; that functions as a vibration dampener to dampen out damaging vibrations transmitted from the towing vehicle and rear wheel of the motorcycle in the course of the motorcycle being towed; that prevents the rear wheel of the motorcycle from damaging skidding when the towing vehicle takes a curve; and that can be quickly and easily disposed in its unloading position to remove the motorcycle from the device.

The objects of this invention, therefore, are to contribute to the solution of the discussed problems of the art.

These objects of the invention and other objects thereof should be discerned and appreciated from the detailed specification taken in conjunction with the drawings, wherein like reference numerals refer to similar parts throughout the several views, in which:

FIG. 1 is a perspective view of the invention showing the device attached to the towing vehicle and showing the front wheel of the motorcycle mounted on the device off the ground and with the rear wheel of the motorcycle on the ground;

FIG. 2 is a view showing the front wheel of the motorcycle resting on elongated channels of the mounting bracket assembly and disposed between spacer plates of the mounting bracket assembly:

FIG. 3 is a sectional view taken in the direction of the arrows 3 — 3 in FIG. 2;

FIG. 4 is a view in the direction of the arrow 4 in FIG. 3 and shows a spring clip disposed with its pull pin;

Figure 5:
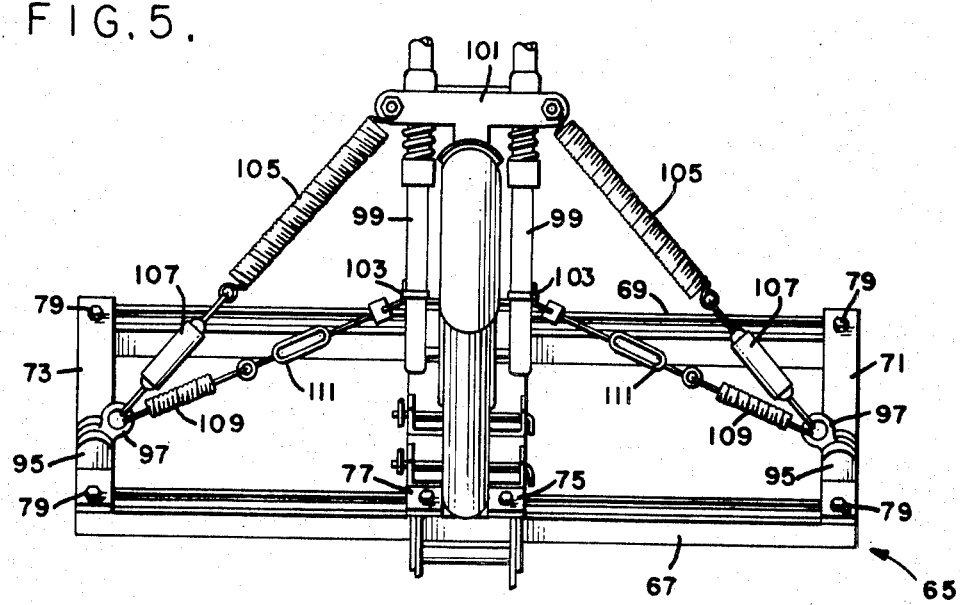
FIG. 5 is a view in the direction of the arrow 5 in FIG. 1.

To facilitate the understanding of the invention, a nomenclature list is hereby provided:

NOMENCLATURE

| | |
|---|---|
| 1 | generally refers to invention |
| 3 | hitch sleeve axle or frame mounted on towing vehicle |
| 5 | generally refers to hitch-bar assembly |
| 7 | insert bar or shank of hitch-bar assembly |
| 9 | spring-clipped pull pin |
| 11 | hole |
| 13 | U-shaped plate |
| 15 | facing plate |
| 17 | side plate |
| 19 | side plate |
| 21 | support angles |
| 23 | hole |
| 25 | hole |
| 27 | hole |
| 29 | hole |
| 31 | sleeve |
| 33 | sleeve |
| 35 | sleeve |
| 37 | sleeve |
| 39 | radius curve |
| 41 | radius curve |
| 43 | generally refers to frame assembly |
| 45 | frame side plate |
| 47 | frame side plate |
| 49 | upper angle |
| 51 | lower angle |
| 53 | holes in upper angle 49 |
| 55 | holes |
| 57 | holes |
| 59 | holes |
| 61 | arcuate slots |
| 63 | arcuate slots |
| 65 | generally refers to mounting bracket assembly |
| 67 | left elongated channel |
| 69 | right elongated channel |
| 71 | end spacer plate |
| 73 | end spacer plate |
| 75 | middle spacer plate |
| 77 | middle spacer plate |
| 79 | nut-engaged bolts |
| 81 | nut-engaged bolts |
| 83 | front wheel of motorcycle |
| 85 | L-shaped wheel brackets |
| 87 | holes |
| 89 | pull pins |
| 91 | spring clips |
| 93 | wheel rim of front wheel 83 |
| 95 | ring brackets |
| 97 | rings |
| 99 | spring forks of motorcycle |
| 101 | spring bracket |
| 103 | spring brackets |
| 105 | main springs |
| 107 | turnbuckles of main springs 105 |

| 109 | auxiliary springs |
| 111 | turnbuckles of auxiliary springs 109 |
| 113 | pull pins |
| 115 | flanges |
| 117 | dotted line position of mounting bracket assembly 65 |
| 119 | rear wheel of motorcycle |
| 121 | generally refers to front steering assembly of motorcycle |
| 123 | dotted line position of mounting bracket assembly 65 |

Figure 10:
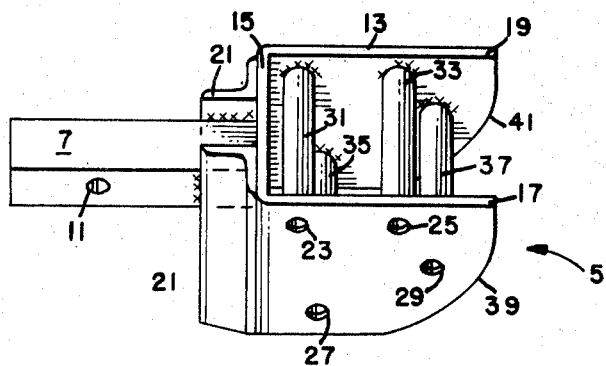
FIG. 10 is a perspective view of the hitch-bar assembly.

In FIG. 1 of the drawing, reference numeral 1 generally refers to the invention showing a two-wheel motorcycle having a pivotal front wheel and a rear wheel being towed by a towing vehicle such as a truck. Hitch sleeve 3 is axle or frame mounted on the towing vehicle. Hitch sleeve 3 carries the hitch-bar assembly, generally referred to by reference numeral 5 and shown more fully in FIG. 10, by means of the insert bar or shank 7 of the hitch-bar assembly 5 received within hitch sleeve 3 and retained by a spring-clipped pull pin 9 transversely disposed through aligned holes 11 formed through hitch sleeve 3 and bar 7.

Insert bar 7 is suitably fixed to a U-shaped plate 13 having a facing plate 15 and side plates 17 and 19 such as by welding bar 7 to facing plate 15 with support angles 21 welded to both bar 7 and facing plate 15. Aligned holes 23, 25, 27 and 29 formed through side plates 17 and 19 communicate with their respective sleeves 31, 33, 35 and 37 disposed between side plates 17 and 19, and suitably welded thereto. The right sides of side plates 17 and 19 have respective radius curves 39 and 41.

Figure 9:
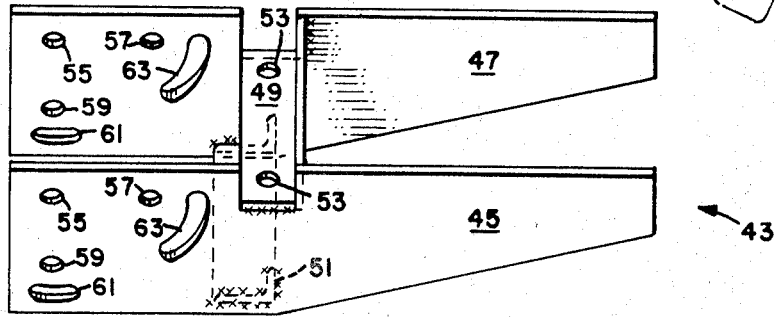
FIG. 9 is a perspective view of the frame assembly.

Hitch-bar assembly 5 mounts and carries frame assembly, generally referred to by reference numeral 43 and shown more fully in FIG. 9. Frame assembly 43 has frame side plates 45 and 47, spaced apart to receive therebetween side plates 17 and 19 of hitch-bar assembly 5, and which frame side plates 45 and 47 are supported in their spacing by upper and lower angles 49 and 51 welded thereto. Upper angle 49 has holes 53 formed therethrough. Formed through frame side plates 45 and 47 are aligned holes 55, 57 and 59, and arcuate slots 61 and 63, as shown.

Figure 7:
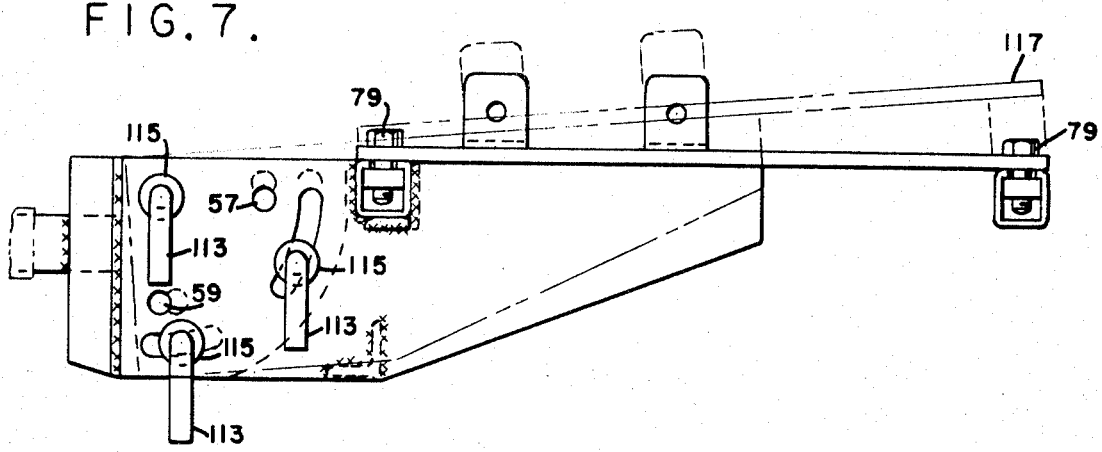
FIG. 7 shows the frame assembly carried on the hitch-bar assembly and with the mounting bracket assembly carried by the frame assembly.
Figure 11:
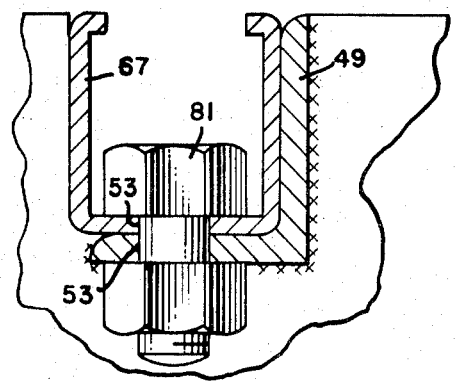
FIG. 11 shows an elongated channel of the mounting bracket assembly carried on the frame assembly.

Frame assembly 43 carries the mounting bracket assembly generally referred to by reference numeral 65. As viewed in FIG. 1, mounting bracket assembly 65 has left and right elongated channels 67 and 69 spaced apart by end plates 71 and 73 and middle spacer plates 75 and 77. As shown in FIGS. 2 and 7, these spacer plates are fixed to the elongated channels 67 and 69 by nut-engaged bolts 79. With reference to FIGS. 9 and 11, left elongated channel 67 is complementally received by upper angle 49 of frame assembly 43 and fixed thereto by means of nut-engaged bolts 81 disposed through common aligned holes 53 formed through left elongated channel 67 and upper angle 49 such that mounting bracket assembly 65 is disposed symmetrically with reference to frame assembly 43. Middle spacer plates 75 and 77 are disposed apart sufficiently to provide lateral support thereby for the front wheel 83 of the motorcycle.

Fixed to and upstanding from middle spacer plates 75 and 77 are L-shaped wheel brackets 85 having aligned holes 87 receiving therethrough pull pins 89 retained by spring clips 91, as shown in FIGS. 2, 3 and 4. As shown, the pull pins 89 are disposed over the wheel rim 93 of the front wheel 83 of the motorcycle.

Fixed to and upstanding from end spacer plates 71 and 73 are ring brackets 95 pivotally mounting rings 97. Mounted on the spring forks 99 of the motorcycle is a spring bracket 101. Mounted on the spring forks 99 are spring brackets or clips 103. Carried and disposed by the rings 97 and spring bracket 101 are main springs 105 whose tension may be varied by appropriate adjustment of their associated turnbuckles 107. Carried and disposed by rings 97 and spring brackets 103 are auxiliary springs 109 whose tension may be varied by appropriate adjustment of their associated turnbuckles 111.

Figure 6:
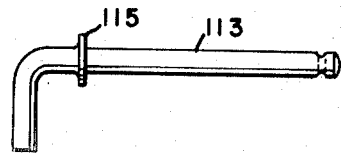
FIG. 6 shows a flanged pull pin utilized with the invention.

FIG. 6 shows the pull pins 113 utilized to mount and carry the mounting bracket assembly 65 on frame assembly 43. Pull pins 113 have flanges 115 and are retainable in their disposition by spring clips 91.

Mounting bracket assembly 65, shown in FIG. 1 as being carried on frame assembly 43, is shown in greater detail in FIG. 7. Holes 55, holes 23 and sleeve 31 are aligned, and a pull pin 113 is disposed therethrough and spring-clipped. Arcuate slots 61, holes 27 and sleeve 35 are aligned, and a pull pin 113 is disposed therethrough and spring-clipped. Arcuate slots 63, holes 29 and sleeve 37 are aligned, and a pull pin 113 is disposed therethrough and spring-clipped. The dotted line position 117 of the mounting bracket assembly 65 in FIG. 7 shows the extent of upward rotary movement mounting bracket assembly 65 is allowed to travel — such upward rotary travel being occasioned such as when the rear wheel 119 of the motorcycle hits a bump. Such upward rotary movement is permitted because pull pin 113 disposed through aligned holes 55, holes 23 and sleeve 31 functions as a pivot point, while allowing frame side plates 45 and 47 to rotate upwardly with pull pins 113 disposed through holes 27, sleeve 35 and holes 29, sleeve 37 being guided by their respective arcuate slots 61 and 63 which further function as limit stops to prevent further upward rotary movement of frame side plates 45 and 47. When the rear wheel 119 of the motorcycle hits a bump while being towed or is otherwise suddenly raised while being towed, impact shock forces are transmitted through the motorcycle which result in stress and strain on and to the motorcycle including the steering assembly, generally referred to by reference numeral 121, its mechanism and bearings, and stress and strain on the front wheel, tire and wheel bearings, with consequent damage to the motorcycle and its described parts depending upon the magnitude of impact shock forces transmitted — unless such transmitted shock forces are permitted to be relieved and attenuated by up and down return movement of the rear wheel 119 and appropriate movement of the front wheel 83. As have been described, when rear wheel 119 hits a bump, the impact shock forces so transmitted are relieved and attenuated by corresponding and compensating up and down return movement of rear wheel 119 and rocking movement of front wheel 83 by means of the upward and return rotary movement allowed by the mounting bracket assembly 65 fixed to frame assembly 43.

As viewed in FIGS. 1 and 2, where circular front wheel 83 rests upon the left and right elongated channels 67 and 69, and considering the middle spacer plates 75 and 77 as chords, the area of the circular front wheel so described as bounded may be considered as a minor circular segment. Hence, front wheel 83 is not wedged by elongated channels 67 and 69, but has some minor rotative play or rock whose magnitude is restricted by the pull pins 89 carried by L-shaped wheel brackets 85.

When the towing vehicle moves straight ahead on level ground, the front wheel is in an upright position, as well as the motorcycle itself, maintained by the main springs 105 whose tension is adjustable by their respective turnbuckles 107. Viewing the towing vehicle on level ground and from its rear, and drawing an imaginary vertical plane through the middle of the towing vehicle, this vertical plane will be perpendicular to the level ground. Assuming the hitch-bar assembly 5, frame assembly 43 and mounting bracket assembly 65 are arranged and carried symmetrically relative to the towing vehicle, the imaginary vertical plane drawn through the middle of the front and rear wheels 83 and 119 of the motorcycle will be coplanar with the towing vehicle's vertical plane. However, when the towing vehicle takes a curve or deviates from straight ahead movement, the vertical plane of the towing vehicle will tilt or cant right or left depending upon the curve or deviated movement. Hence, for the motorcycle to be properly towed without any damage in the recurring situations of the towing vehicle's taking curves or deviating movements, the vertical plane of the motorcycle must correspondingly tilt or cant the same as that of the towing vehicle in order that the towed motorcycle can and will track the towing vehicle. If the front wheel 83 were maintained in a rigid, upright position, the tire on the rear wheel 119 will skid causing excessive tire wear when the towing vehicle takes a curve thereby further resulting in stress and strain, and possible damage, to the motorcycle's steering assembly, its mechanism and bearings, as well a damage to its other parts.

With the towing device of this invention, moreover, and with proper tension on main springs 105, the towed motorcycle will correspondingly tilt or cant the same degree as the towing vehicle with the result that the towed motorcycle will follow the same track as the towing vehicle taking a curve, without the tire on the rear wheel 119 skidding and without stress or strain to the towed motorcycle. Main springs 105 also function as vibration dampeners to dampen out vibrations transmitted from the towing vehicle and rear wheel 119. This necessary tilt or cant of the towed motorcycle's vertical plane for proper tracking may also be referred to as side-to side, or lateral movement. The fact that the front wheel 83 is not wedged between middle spacer plates 75 and 77 but that middle spacer plates 75 and 77 merely provide lateral support for the front wheel 83 allows the motorcycle to tilt or cant to its required corresponding degree. The fact also that the front wheel 83 is not wedged by elongated channels 67 and 69 allows front wheel 83 some minor rotative play or rock thereby functioning as a vibration dampener to dampen out vibrations transmitted from the towing vehicle and rear wheel 119.

Assuming the vertical plane of the towing vehicle is tilted to the left as the towing vehicle takes a curve to the right, the vertical plane of the towed motorcycle will correspondingly tilt to the left and, as viewed from the rear of the motorcycle, there will be less than normal tension on the main spring 105 on the left side of the motorcycle but greater than normal tension on the main spring 105 on the right side of the motorcycle. When the towing vehicle completes the curve and straightens out, the greater than normal tension on the main spring 105 on the right side of the motorcycle acts as a restoring force to contribute to restoring the motorcycle to its normal upright position.

The purposes of the auxiliary springs 109 are twofold. Auxiliary springs 109 serve as a safety factor to supplant to some degree the functions of the main springs 105 in case of their malfunction or breakage, and auxiliary springs 109 function as vibration dampeners to dampen out vibrations transmitted from the towing vehicle and rear wheel 119.

Figure 8:
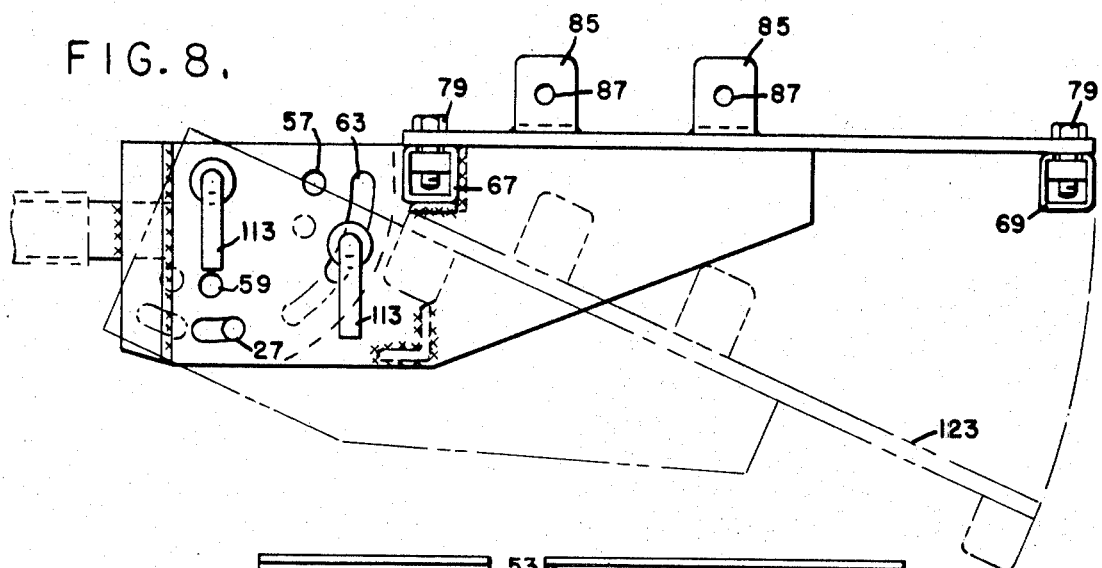
FIG. 8 is similar to FIG. 7 but shows the loading position of the device for loading the motorcycle for towing.

The dotted line position 123 of mounting bracket assembly 65 in FIG. 8 shows mounting bracket assembly 65 ready for loading of the motorcycle. In loading position 123, pull pin 113 is disposed through aligned arcuate slots 63, holes 29 and sleeve 37, pull pin 113 is disposed through aligned holes 55, holes 23 and sleeve 31, and the bottom of right elongated channel 69 rests on the ground. The motorcycle is simply wheeled onto the mounting bracket assembly 65 such that its front wheel 83 rests on elongated channels 67 and 69 and is disposed between middle spacer plates 75 and 77 with pull pins 89, disposed over wheel rim 93 of front wheel 83 through aligned holes 87 of L-shaped wheel brackets 85, retained by their spring clips 91, and the main springs 105 and auxiliary springs 109 are attached to the motorcycle as has been heretofore described. To prepare the device for towing, mounting bracket assembly 65 is appropriately raised or jacked-up to allow pull pin 113 to be disposed through aligned arcuate slots 61, holes 27 and sleeve 35.

To unload the motorcycle from the device, the reverse procedure is followed.

After the motorcycle has been unloaded from the mounting bracket assembly 65, the device may be disposed in its compact unloaded position, not shown. In this compact unloaded position, the hitch-bar assembly has its hitch bar 7 received within hitch sleeve 3 and retained by the spring-clipped pull pin 9. The mounting bracket assembly 65 is carried by the frame assembly 43 as has been heretofore described. Pull pin 113 is disposed through aligned holes 55, holes 23 and sleeve 31. Then the mounting bracket assembly 65 is rotated counter-clockwise sufficiently such that pull pin 113 can be disposed through aligned holes 57, holes 25 and sleeve 33.

Having thusly described my invention, I claim:

1. A device for use with a towing vehicle to tow a two-wheeled vehicle having a pivotal front wheel and a rear wheel, said device comprising first means mounting said front wheel, and disposing and maintaining said towed vehicle in a upright position in the straight ahead movements of said towing vehicle and causing said towed vehicle to track said towing vehicle taking a curve or deviating from straight ahead movement by tilting or canting movement of said towed vehicle corresponding to the tilting or canting movement of said towing vehicle taking a curve or deviating from straight ahead movement, said first means comprising a mounting bracket assembly having spacer plates, said front wheel of said towed vehicle being disposed between said spacer plates, said spacer plates being spaced apart sufficiently to receive said front wheel of said towed vehicle and to provide lateral support for said front wheel of said towed vehicle, and second means for attaching said first means to said towing vehicle.

2. A device in accordance with claim 1, wherein said mounting bracket assembly includes elongated channels upon which said front wheel of said towed vehicle rests.

3. A device in accordance with claim 1, wherein said mounting bracket assembly includes main springs attached to said towed vehicle.

4. A device in accordance with claim 1, wherein said front wheel of said towed vehicle being disposed between said spacer plates, said spacer plates being spaced apart sufficiently to receive said front wheel of said towed vehicle and to provide lateral support for said front wheel of said towed vehicle and said mounting bracket assembly having main springs attached to said towed vehicle.

5. A device in accordance with claim 1, wherein said front wheel of said towed vehicle being disposed between said spacer plates, said spacer plates being spaced apart sufficiently to receive said front wheel of said towed vehicle and to provide lateral support for said front wheel of said towed vehicle, said mounting bracket assembly having main springs attached to said towed vehicle and having auxiliary springs attached to said towed vehicle.

6. A device in accordance with claim 1, wherein said second means comprises a hitch-bar assembly and a hitch sleeve adapted to be mounted on said towing vehicle, said hitch-bar assembly having a hitch bar adapted to be detachably fixed to said hitch sleeve of said towing vehicle.

7. A device in accordance with claim 1, wherein said first means includes a frame assembly, wherein said second means comprises a hitch-bar assembly and a hitch sleeve adapted to be mounted on said towing vehicle, said hitch-bar assembly having a hitch bar adapted to be detachably fixed to said hitch sleeve of said towing vehicle, wherein said hitch-bar assembly carries said frame assembly and said frame assembly carries said mounting bracket assembly, and wherein said hitch-bar assembly and frame assembly have cooperating means allowing up and down return movement of said mounting bracket assembly when said rear wheel of said towed vehicle hits a bump.

8. A device in accordance with claim 7, wherein said mounting bracket assembly has elongated channels upon which said front wheel of said towed vehicle rests, said mounting bracket assembly has spacer plates providing lateral support for said front wheel of said towed vehicle and said mounting bracket assembly has main springs attached to said towed vehicle.

9. A device in accordance with claim 8, wherein said mounting bracket assembly has auxiliary springs attached to said towed vehicle.

* * * * *